United States Patent
Richardson

(10) Patent No.: US 7,341,183 B2
(45) Date of Patent: Mar. 11, 2008

(54) SYSTEM AND METHOD FOR DISTRIBUTING MEDIA

(75) Inventor: Roger D. Richardson, Wheeling, IL (US)

(73) Assignee: Motorola Inc., Schaumburg, IL (US)

( * ) Notice: Subject to any disclaimer, the term of this patent is extended or adjusted under 35 U.S.C. 154(b) by 387 days.

(21) Appl. No.: 11/024,534

(22) Filed: Dec. 29, 2004

(65) Prior Publication Data
US 2006/0143130 A1   Jun. 29, 2006

(51) Int. Cl.
*G06F 7/08*   (2006.01)

(52) U.S. Cl. ........................ 235/381; 235/380; 235/379

(58) Field of Classification Search ................ 235/380, 235/382, 379, 487
See application file for complete search history.

(56) References Cited

U.S. PATENT DOCUMENTS

| | | | |
|---|---|---|---|
| 6,751,336 B2 | 6/2004 | Zhao | |
| 2002/0100803 A1* | 8/2002 | Sehr | 235/384 |
| 2003/0069904 A1 | 4/2003 | Hsu et al. | |
| 2004/0093273 A1 | 5/2004 | Laurent et al. | |
| 2004/0103064 A1 | 5/2004 | Howard et al. | |

* cited by examiner

Primary Examiner—Karl D. Frech
(74) Attorney, Agent, or Firm—Sylvia Chen

(57) ABSTRACT

A method, system and apparatus for distributing limited media to a user through a user interface. The method, system and apparatus includes a media distribution database (202, 302) for storing limited media, and a first server (206) in communication with the media distribution database (202, 302) and a user interface (204). The first server (206) is capable of transmitting an identification code (114) to the user, and the user is capable of transmitting the identification (114) to the media distribution database (202, 302) to receive access to the limited media (136).

20 Claims, 3 Drawing Sheets

SYSTEM AND METHOD FOR DISTRIBUTING MEDIA

FIELD OF THE INVENTION

This disclosure relates in general to digital rights management.

BACKGROUND OF THE INVENTION

Event ticketing provides a user or customer with a document for access to an event, in particular, a bar coded document delivered to the user's email address, postal address, or picked up personally. Additionally, before, while or after the ticket purchasing process, the customer may be offered goods and services for purchase by the ticket vendor and/or other authorized vendors. For example, the ticket vendor or other vendor may offer the customer a tangible product such as a tee shirt or baseball cap bearing an insignia relating to the event. Moreover, a vendor may offer for sale a digital file such as an audio or video clip.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
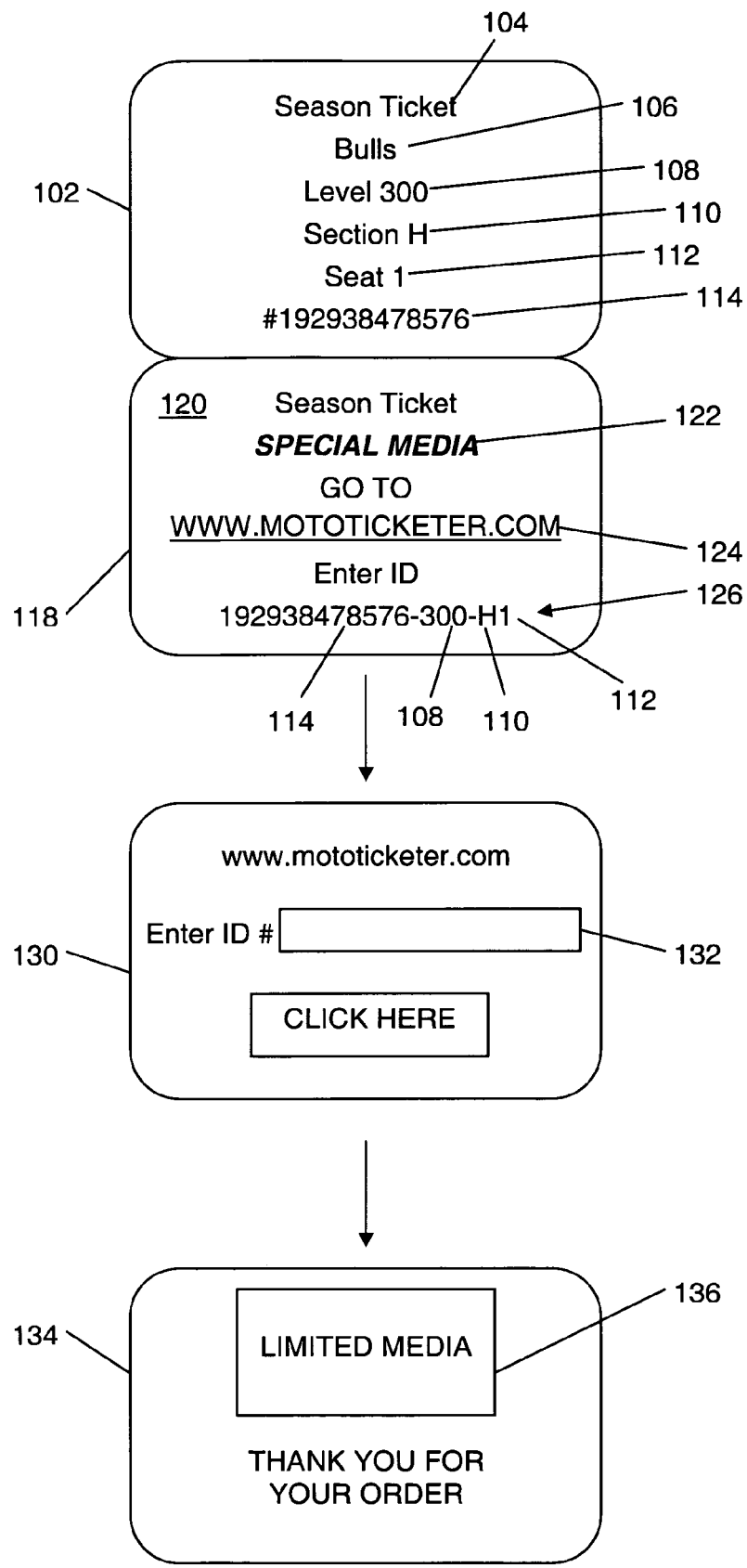
FIG. 1 depicts a transaction, according to an embodiment, that may be displayed on a computer screen of a user interface including the goods purchased, a transaction identification number, and subsequent screens for processing a limited media offer.

A method, system, and apparatus for a transaction including an offer for limited media are disclosed herein. The limited media may be, for example, time-limited, cost-limited, replay-limited, and/or copy protected. A transaction such as event ticketing provides a ticket for access to, for example, entertainment such as a sports event, access to transportation, or access to a museum. A transaction such as a purchase for soft goods including software and digital media, for example, provides delivery of digital downloads from a remote server to a customer's computer through the Internet. Also, a transaction for a purchase of hard goods, for example, provides clothing, appliances, or automobiles that are typically shipped to or received at a physical location. In the instant disclosure, the method, system and apparatus is described with reference to a transaction which may be an online purchase of an event ticket, however, it will be understood that any type of transaction is within the scope of this disclosure. In an embodiment disclosed below, when a user makes payment during the transaction for the purchase of an event ticket by standard means or another arrangement, the user receives a time-limited offer for media, either free or for a price. It will be further understood that any type of limited media is within the scope of this disclosure.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

A user may make a purchase online or make a purchase at a designated purchase location, for example, at a kiosk in a store, mall, or other location. The transaction, in accordance with the following disclosure, may include a related limited media offer wherein special access to related media may be provided in conjunction with the transaction. The media is related to the online purchase in a way that is under the vendor's control. For example, if the transaction is for an event ticket purchase for a performance, the related media may be specific to the performer, such as a video or an audio sample featuring the performer.

FIG. 1 depicts information relating to a transaction that may be displayed on a computer screen of a user interface in accordance with an embodiment. The information includes the goods purchased, a transaction identification number, and subsequent screens for processing a related limited media offer. When engaging in a transaction such as a ticket purchase for an event, the user will receive a ticket 102 such as that shown in FIG. 1. When making a purchase for soft or hard goods, a receipt may similarly show information relating to the purchased item. The transaction described herein is an online purchase of an event ticket. It will be understood that any type of transaction and any type of purchase is within the scope of this discussion.

The ticket 102 as depicted in FIG. 1 may be printed in hard copy or displayed on a display screen of a computer system. The ticket 102 shown is an example, and a ticket may take any form. The ticket 102 shown includes information about the event and the ticket particulars. For example, ticket 102, shows that it is a season ticket 104 for admittance to games of entertainers 106, the "Bulls." It shows the seating level 108, the seating section 110 and the seat 112.

A ticket 102 may include a unique identifier. In FIG. 1, the ticket shows an identification number 114, here "#192938478576." The number may be the ticket number or an associated voucher number. In any event, the number 114 is an identifier of, for example, the purchaser, the ticket or the media. It will be understood that any identifier that may be entered by a user using a user interface may be employed. An identifier or code need not consist solely of numerals but may include alphanumeric characters, punctuation and/or other characters as may be recognized by a user. In addition, the identifier may be encrypted or otherwise specialized.

The form of the ID# 114 and any additional identifying information may be of any type. The information provided by an ID code 126 may provide the user access to a related limited offer in accordance with the transaction made by the user. Above, an ID#, level, section, and seat were depicted. However, the ID#, the date of the event or purchase may be used, or the time of purchase or the event may be used, or an altogether different ID# may be provided. The ID# may be written to the user's computer for the website's access, or the user may be asked to type it in once on the media distributor's website. In the event that the user does not make an online purchase, but engages in a transaction at a purchase location, the apparatus, system and method as described herein may be modified accordingly.

In the example shown, attached to the ticket 102 is an attachment 118 for an offer 120 for related media "Special Media" 122. Such an attachment may provide information as to how a user may access the related limited media. For example, media may be accessed through a hyperlink on the display screen to be selected by the user with a mouse or other pointing device. Media may also be accessed through a subsequent email from the vendor(s) to the user. It will be understood that the information relating to the special media may be provided by a vendor to the user in any manner.

As described herein, the special media 122 is digital media that is related to the ticket and is downloadable. Alternatively, the media may also be soft or hard goods that may be delivered to the user, for example, via special courier or by mail. In the example shown in FIG. 1, the user may be directed to go to the website of the distributor of the media, www.mototicketer.com 124 (herein a fictitious example) and enter an ID code such as that provided as number 114 and here including the level 108, section 110 and seat 112 information. The user may click on www.mototicketer.com 124 to access a screen 130. Accordingly, the user may enter the ID# 114 plus any other requested information 132.

At the time of the transaction, the offer may be made to the user for time-limited media related to the event. The offer may be time-limited in the sense that it is offered in conjunction with transactions made at a particular time. The related time-limited offer 120 may be valid for any particular length of time or any number of releases chosen by the ticket vendor and/or the licensor of the media. Furthermore, access to the media may be available to the user with or without expiration. Returning to the example of the Bulls tickets, the time-limited offer may be for the immediate time interval from the time of the transaction, or may be for one hour from the time of purchase, or, for example every day leading up to the first game. The media may include, for example, a digital download of video of practice clips made by the Bulls that day.

The ability for the vendor to make a time-limited offer may provide incentive to the buyer to make a purchase so that he or she may receive the download in the example above. As a marketing effort, the vendor may advertise that the time-limited offer is available only for season ticket holders at the time of purchase. Accordingly, more users may be inclined to make season ticket purchases. The vendor may further advertise the date and/or time a particular time-limited offer(s) will be made, and therefore, users may be more inclined to buy at that time. Vendors may be able to make additional or different offers closer to the event to entice more users to make purchases. Since the offer is time-limited and tied to particular transactions, users may perceive special added value and a sense of elitism to the purchase.

After completing the transaction with the vendor, the user may be able to receive the limited media as authorized by the vendor. As mentioned above, the user may visit the media distributor's website 130 to receive 134 the related limited media 136 via download. The data may be written to the user's hard drive or to an external disk.

The limited media can be free or may be provided for a charge. A user may receive a discount on the limited media whereas one who is not processing a transaction in the manner described herein may pay full price for the media. As a transaction enticement, the related media is offered to the user either free or for a reduced price in a limited manner. In another embodiment, the limited media may be replay-limited, in the case of audio or visual content or games or the like. Thus, the user may obtain a larger number of replay opportunities than someone who is not processing a transaction in the manner described herein.

For a process or manner in which to effect distribution of the related limited media, the vendor associates itself with a distribution channel for the limited media. When the media is digital, it is protected by, for example, a digital rights management (DRM) company that, in the best circumstance, provides appropriate anti-copy protection. By transmitting the media to the user by a DRM process, the licensor of the media may maintain control of its use. For example, the media may be single use or may be available for use indefinitely. A user may further be able to share it with peers, or not, depending on DRM restrictions.

Figure 2:
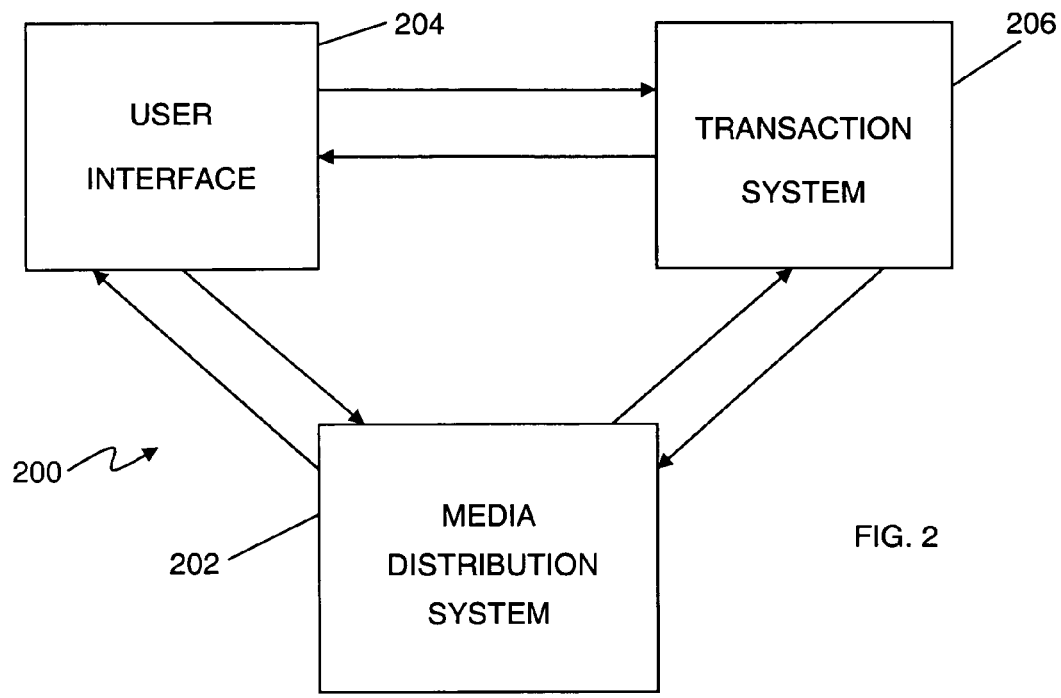
FIG. 2 depicts a block diagram of the devices of the overall system, according to an embodiment, operating to effect communication between a media distribution system, the user interface, and a transaction system.
Figure 3:
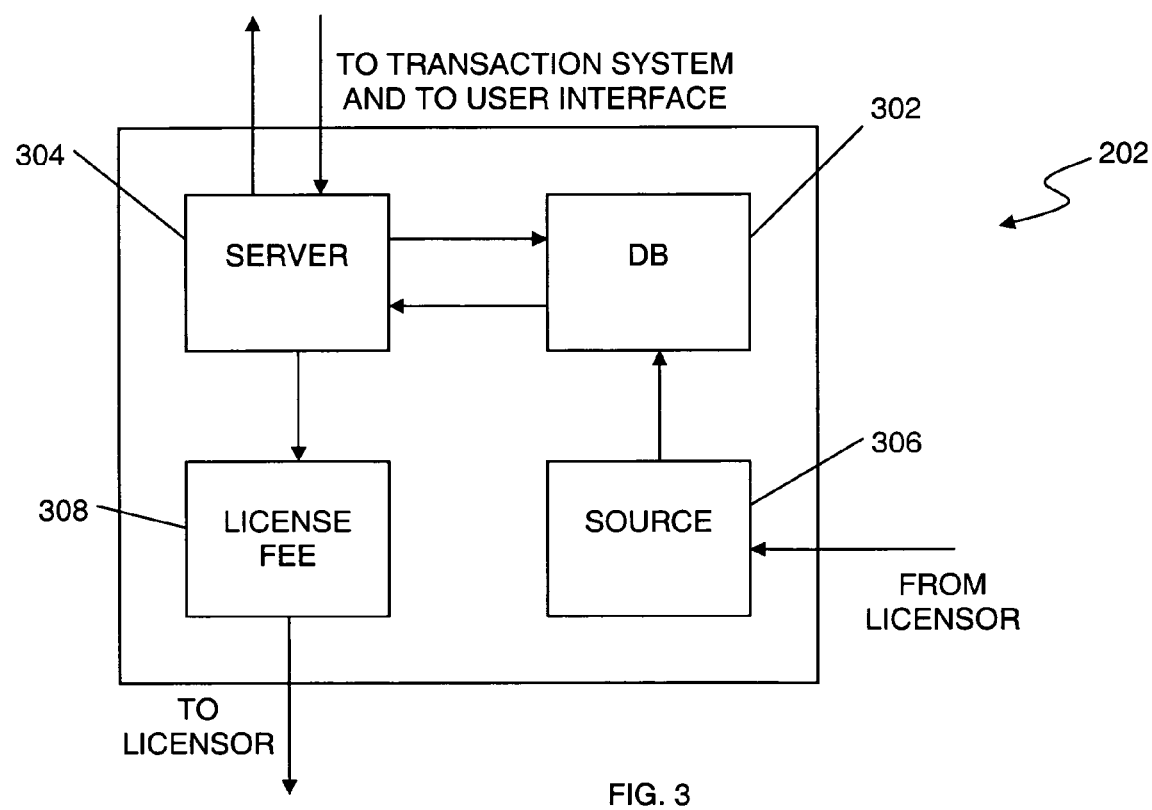
FIG. 3 depicts the media distribution system shown in FIG. 2.

FIG. 2 depicts a block diagram of the devices of the overall operation to effect communication 200 between a media distribution system 202, a user interface 204, and a transaction system implemented by a first server 206, according to an embodiment. The media is stored in a database 302 that may be part of media distribution system 202 (as depicted in FIG. 3). The user interface 204 may engage in a transaction according to instructions carried out by transaction system 206 as described with respect to FIG. 1 wherein the purchased ticket is associated with an ID# 114. The media distribution system 202 links the ID# 114 with the limited media 136. The transaction system 206 links the ID# 114 with the ticket 102.

Generation and tracking of downloadable coding information may be provided by either the transaction system 206 or the media distribution system 202, or by an arrangement between them. In one embodiment, the unique identifier of the ticket may be re-purposed to being a password/ID for an electronic download. The download is therefore related to the ticket. The ticket ID gives special access relative to non-ticket downloaders. As mentioned above, the ID#114 enables download of the media in a time-limited and/or cost-reduced and/or replay-enhanced manner. Of course, other media-related benefits can be implemented.

FIG. 3 depicts the media distribution system 202 shown in FIG. 2. Linking the ticket number 114 into an accessible database 302 of the media distribution system 202 will allow the original user at user interface 204 access to a specific media set via a server 304. The user interface 204 may be a computer, a telephone, a PDA, or any other electronic device capable of communication.

DRM may limit access via copy protection of the limited media in many different manners. As mentioned above, the original user may have limited or unlimited access to the limited media download according to an arrangement made by the license fee sourcing sub-system 308. Standard digital rights management of the media distribution system 202 may provide features such as forwarding of the ticket-related download to a peer, triggering standard DRM license acquisition by the peer. Alternatively, the vendor associated with the transaction system 206, and/or licensors providing the media at source 306 may choose to only allow the user engaged in the subject transaction the benefit of the limited media offer, and provide that it is not otherwise for sale. In this way, the copy protected limited media may be offered only to a user who engages in a transaction having this type of a limited media offer.

In another embodiment, the ID# 114 may be transferable. That is, the original user using user interface 204 will be able to send the media either opened or unopened to another device. Alternatively, the user may be able to send the ID# to another person or device and a different user will be able to access the media distribution system 202.

The media distribution system 202 is in communication with the transaction system 206 so that after the transaction is made by the user at the user interface 204, the media distribution system 202 will be able to transmit the download. In embodiments discussed above, the timing, process and rules are at the discretion of the vendor operating the transaction system 206 and the distributor operating the media distribution system 202. The media distribution system 202 may act as the central source for authentication of the ID/voucher number and as the policing system for collecting any fees associated with the use licenses. These elements alternatively may be out-sourced. It will be understood that alternative manners in which to make the limited media offer to the user and to deliver the contents are within the scope of this discussion.

Figure 4:
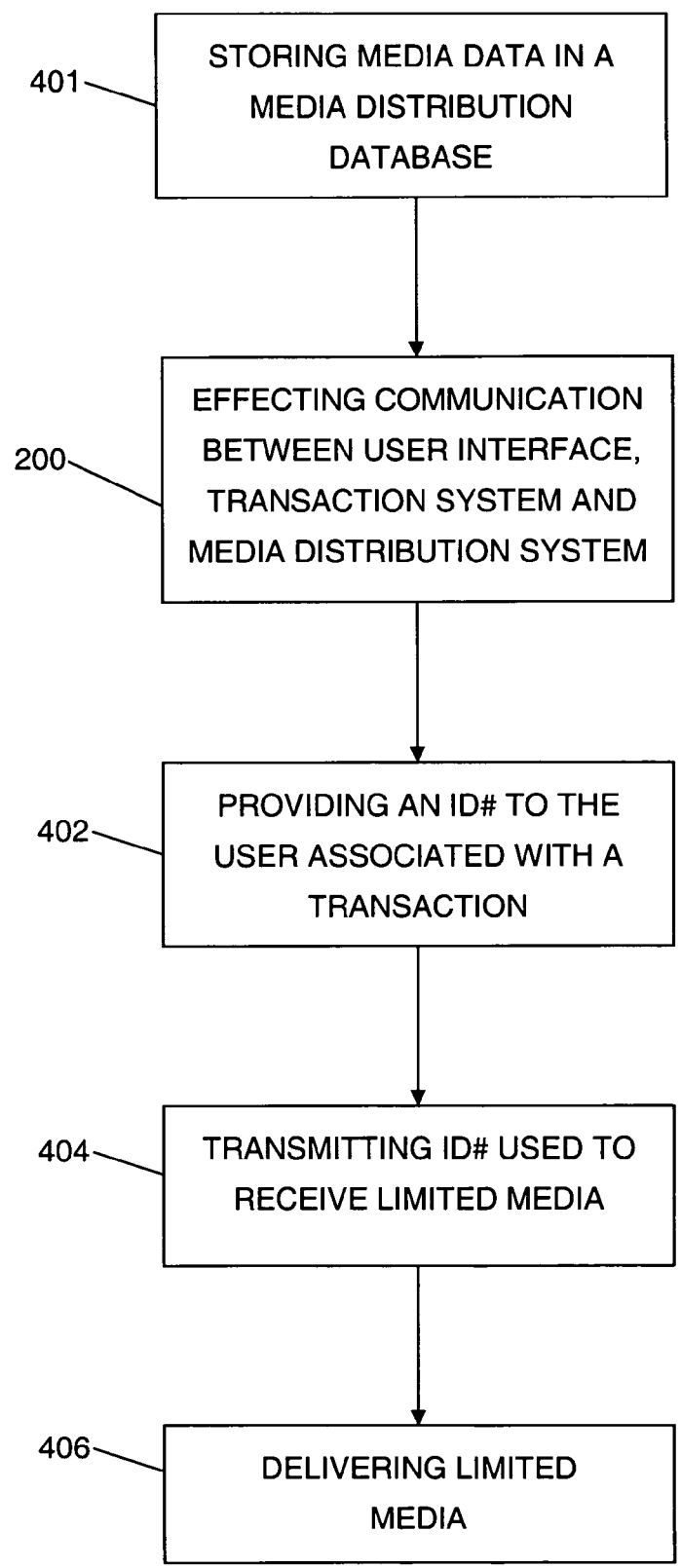
FIG. 4 depicts a flowchart of a process, according to an embodiment, by which the user receives the ID#, the ID# is transmitted, and the limited media is delivered.

FIG. 4 depicts a flowchart of the process, according to an embodiment, by which the user receives the ID# 114, the ID# 114 is transmitted and the limited media 136 is delivered. The method according to FIG. 4 may include steps in the following order: storing media data in a media distribution database 401, effecting communication 200 among the media distribution system 202, the user interface 204 and the transaction system 206; the user interface 204 engages in a transaction 402 and receives transaction data including the ID#114; the ID#114 is then used 404 to receive the limited media; the limited media is accordingly delivered 406. Regarding the transmitting 402, the ID#114 is sent either by the user or it may be automatically sent to the media distribution system 202. Regarding the delivering of media 406, the distributed media may be automatically delivered to the user interface or the user can manually download the media.

As discussed in detail above, the limited media offer is related to a transaction. The transactions may further include, for example, any time a credit card is used, an electronic greeting card is processed, subscription services are delivered, and may further be embedded in a magazine, on CDs, DVDs, and as video game extras. The digital rights management of the media distribution system 202 includes, for example, the ability to limit file usage, to enable file sharing, to allow others to pay for file access, and to track usage patterns.

It will be understood that the marketing opportunities relating to a limited media offer based upon a particular transaction are at the discretion of the vendor and/or the licensor. Entertainment events such as sports may include graduated access to the media based upon seat cost. Special packages and season ticket holder specials may include, for example, distinctly unique items and downloadable media not sharable until after the season's end. Entertainment event such as concerts may include opportunities for back stage access, and for engaging in email to and from the performers. Coupons for use at the event may also be considered. Entry into contests may also be provided. Post event access may further be provided, where video, audio or other digital media such as screen savers depicting the performers or audio created for the purpose of entertainment recorded live at the subject concert for use as a telephone ring signal may be downloaded.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A system for distributing media to a user comprising:
   a media distribution database for storing limited media data;
   a first server in communication with the media distribution database and the user, capable of transmitting limited media data to the user; and
   a second server for processing a transaction between a vendor and the user, providing to the user an identification code associated with the transaction;
   wherein the identification code may be transmitted to the first server and wherein upon receipt of the identification code, limited media data stored in the media distribution database will be transmitted to the user.

2. A system as recited in claim 1 wherein the first server is a media distribution database server.

3. A system as recited in claim 1 wherein the second server is a transaction server.

4. A system as recited in claim 1 wherein the first server and the second server are a single server.

5. A system as recited in claim 1 wherein the limited media data comprises copy protected media.

6. A system as recited in claim 1 wherein the limited media data comprises time-limited media.

7. A system as recited in claim 1 wherein the limited media data comprises cost-limited media.

8. A method for distributing media to a user, comprising:
   storing limited media data in a media distribution database;

effecting communication between a first server, the media distribution database and the user;

providing to the user an identification code associated with a transaction;

transmitting the identification code associated with the transaction to the first server; and upon receipt of the identification code, transmitting limited media data stored in the media distribution database to the user.

9. A method as recited in claim 8 wherein the first server is a media distribution database server.

10. A method as recited in claim 8 further comprising:

effecting communication between a second server that is a transaction server for processing a transaction between a vendor and the user.

11. A method as recited in claim 8 further comprising time limiting the limited media data.

12. A method as recited in claim 8 further comprising copy protecting the limited media data.

13. A method as recited in claim 8, further comprising cost limiting the limited media data.

14. An apparatus for delivering media to a user, comprising:

a user interface for providing a user access to transaction data;

a transaction server for receiving and sending transaction data including an identification code; and a media distribution system for storing media and, upon receiving the identification code, transmitting the media to the user;

wherein the media comprises limited media.

15. An apparatus as recited in claim 14 wherein the limited media comprises time-limited media.

16. An apparatus as recited in claim 14 wherein the limited media comprises cost-limited media.

17. An apparatus as recited in claim 14 wherein the limited media comprises copy protected media.

18. An apparatus as recited in claim 14 wherein the user interface comprises a display for displaying transaction data including the identification code.

19. An apparatus as recited in claim 18 wherein the user interface provides a link to the media distribution system.

20. An apparatus as recited in claim 19 wherein the identification code is provided to the media distribution system via the link.

* * * * *